US012615198B2

(12) United States Patent
Shi et al.

(10) Patent No.: US 12,615,198 B2
(45) Date of Patent: Apr. 28, 2026

(54) DYNAMIC TRAFFIC GENERATOR AND NETWORK IMPAIRMENT TOOL FOR SIMULATION OF VIRTUAL NETWORK FABRICS

(71) Applicant: Cisco Technology, Inc., San Jose, CA (US)

(72) Inventors: Sishi Shi, Shanghai (CN); Yuefeng Jiang, Shanghai (CN); Tony Shen, Shanghai (CN); Siwei Wu, Shanghai (CN); Dean Cheng, Shanghai (CN); Daemon Yang, LiaoNing (CN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/356,894

(22) Filed: Jul. 21, 2023

(65) Prior Publication Data

US 2024/0348518 A1      Oct. 17, 2024

Related U.S. Application Data

(60) Provisional application No. 63/495,929, filed on Apr. 13, 2023.

(51) Int. Cl.
*H04L 43/045* (2022.01)
*H04L 41/14* (2022.01)
*H04L 43/20* (2022.01)

(52) U.S. Cl.
CPC .......... *H04L 43/045* (2013.01); *H04L 41/145* (2013.01); *H04L 43/20* (2022.05)

(58) Field of Classification Search
CPC ...... H04L 43/045; H04L 41/145; H04L 43/20
USPC ........................................................ 709/231
See application file for complete search history.

(56) References Cited

U.S. PATENT DOCUMENTS

| | | | | |
|---|---|---|---|---|
| 10,506,031 B1 * | 12/2019 | Cheng | ................. | H04L 43/0876 |
| 11,140,207 B2 * | 10/2021 | Pennarun | ................ | H04L 43/50 |
| 11,502,932 B2 * | 11/2022 | Bergeron | ................ | H04L 43/50 |
| 2018/0123899 A1 * | 5/2018 | Dorr | ..................... | H04L 41/145 |

(Continued)

OTHER PUBLICATIONS

Catal F., et al., "Visualization of Traffic Flows in a Simulated Network Environment to Investigate Abnormal Network Behavior in Complex Network Infrastructures", Sciencedirect, May 2, 2019, vol. 151, pp. 279-286.

*Primary Examiner* — Karen C Tang
(74) *Attorney, Agent, or Firm* — Polsinelli P.C.

(57) ABSTRACT

Disclosed are systems, apparatuses, methods, and computer-readable media for simulating traffic flow in a virtualized network fabric. A method includes: creating in a visualization tool one or more virtual network hubs, one or more virtual branch locations, and one or more virtual internet servers; generating one or more micro-probes for clients/servers to be simulated, one or more of the clients/servers is located in each of the one or more virtual network hubs, virtual branch locations, and the virtual internet servers; generating one or more network impairments, which are associated with one or more of the one or more of network hubs, branch locations, and/or internet server locations; and launching one or more, client-role or server-role traffic invokers in each micro-probe to simulate traffic between the one or more of the virtual network hubs, the virtual branch locations, and/or the virtual internet server.

20 Claims, 5 Drawing Sheets

(56) References Cited

U.S. PATENT DOCUMENTS

| | | | |
|---|---|---|---|
| 2018/0123900 A1* | 5/2018 | Dorr | H04L 41/145 |
| 2020/0127881 A1* | 4/2020 | Kempe | H04L 67/1008 |
| 2021/0218618 A1* | 7/2021 | Rao | H04L 41/40 |
| 2021/0409266 A1* | 12/2021 | Mandal | H04L 41/22 |
| 2022/0245462 A1* | 8/2022 | Dechene | G06N 3/10 |
| 2023/0034229 A1* | 2/2023 | Oliveira | H04L 43/08 |

* cited by examiner

DYNAMIC TRAFFIC GENERATOR AND NETWORK IMPAIRMENT TOOL FOR SIMULATION OF VIRTUAL NETWORK FABRICS

CROSS-REFERENCE TO RELATED APPLICATIONS

This application claims priority to and benefit from U.S. Provisional Patent Application No. 63/495,929 filed on Apr. 13, 2023, which is expressly incorporated herein by reference.

BACKGROUND

Network design traditionally has involved creating a number of connections and deployments based on desired specifications and expected network traffic. The deployment is made. Then, the network traffic is monitored after deployment with modifications and changes being made to either the physical network or the virtual network in a fabric.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

DESCRIPTION

Figure 1:
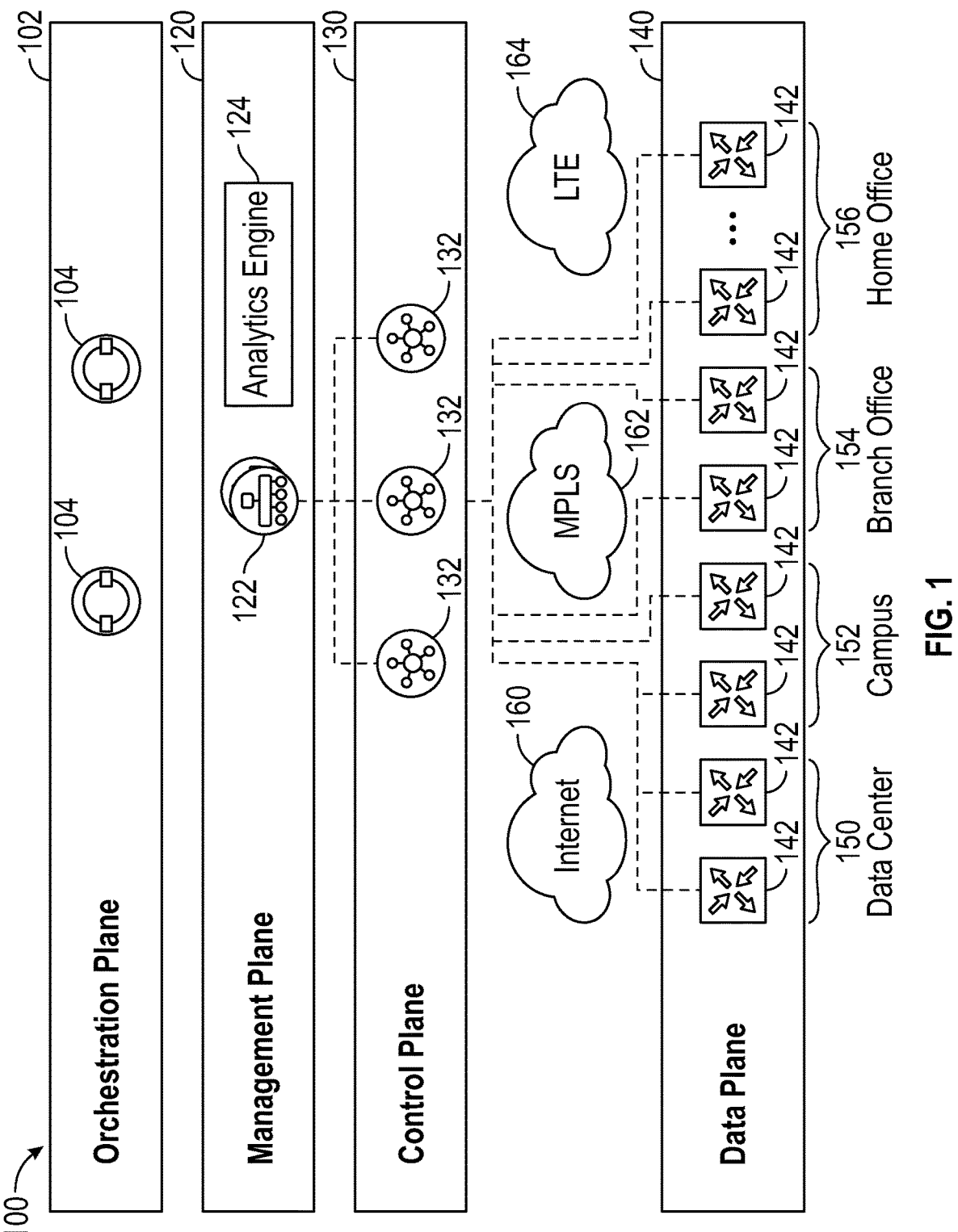
FIG. 1 illustrates an example of a high-level network architecture according to the present disclosure.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Disclosed are systems, apparatuses, methods, computer readable medium, and circuits for simulating traffic flow in a virtualized network fabric. According to at least one example, a method includes: creating in a visualization tool one or more virtual network hubs, one or more virtual branch locations, and one or more virtual internet servers; generating one or more micro-probes for a plurality of clients/servers to be simulated, one or more of the plurality of clients/servers is located in each of the one or more virtual network hubs, the one or more virtual branch locations, and the one or more virtual internet servers; generating one or more network impairments, which are associated with one or more of the one or more of network hubs, branch locations, and/or internet server; and launching one or more, client-role or server-role traffic invokers in each micro-probe to simulate traffic between the one or more of the virtual network hubs, the virtual branch locations, and/or the virtual internet server.

In another example, a system for simulating traffic flow in a virtualized network fabric is provided that includes a storage (e.g., a memory configured to store data, such as virtual content data, one or more images, etc.) and one or more processors (e.g., implemented in circuitry) coupled to the memory and configured to execute instructions and, in conjunction with various components (e.g., a network interface, a display, an output device, etc.), cause the system to create in a visualization tool one or more virtual network hubs, one or more virtual branch locations, and one or more virtual internet servers; generate one or more micro-probes for a plurality of clients/servers to be simulated, one or more of the plurality of clients/servers is located in each of the one or more virtual network hubs, the one or more virtual branch locations, and the one or more virtual internet servers; generate one or more network impairments, which are associated with one or more of the one or more of network hubs, branch locations, and/or internet server; and launch one or more, client-role or server-role traffic invokers in each micro-probe to simulate traffic between the one or more of the virtual network hubs, the virtual branch locations, and/or the virtual internet server.

An example non-transitory computer-readable storage medium having stored therein instructions which, when executed by a processor, cause the processor to create in a visualization tool one or more virtual network hubs, one or more virtual branch locations, and one or more virtual internet servers; generate one or more micro-probes for a plurality of clients/servers to be simulated, one or more of the plurality of clients/servers is located in each of the one or more virtual network hubs, the one or more virtual branch locations, and the one or more virtual internet servers; generate one or more network impairments, which are associated with one or more of the one or more of network hubs, branch locations, and/or internet server; and launch one or more, client-role or server-role traffic invokers in each micro-probe to simulate traffic between the one or more of the virtual network hubs, the virtual branch locations, and/or the virtual internet server.

Example Embodiments

Network operators can configure a network to meet a desired configuration for network traffic. In constructing a network, the network operators can configurate the location of one or more servers, one or more access points (APs), branch locations, virtual networks, and/or internet connectivity. Additionally, the locations can be spread throughout the world and assembled as being operated as a network fabric, such as the examples of FIGS. 1-2. Examples of such configurations are presented herein. The present disclosure can be implemented in other configurations as well. The example components of the network are illustrated, but the network can have additional components, different components, and/or different arrangement of components. The present disclosure implements the proposed network in a simulator for virtualized network architectures. Thus, the present disclosure is operable to run on a server or other device for simulation purposes rather than being an actually implemented system. In this way the simulation can be configured to accept traffic that is based on actual traffic in real world networks or traffic measured from networks that have substantially similar configurations. In other instances, the network traffic can be programmed as well.

Figure 2:
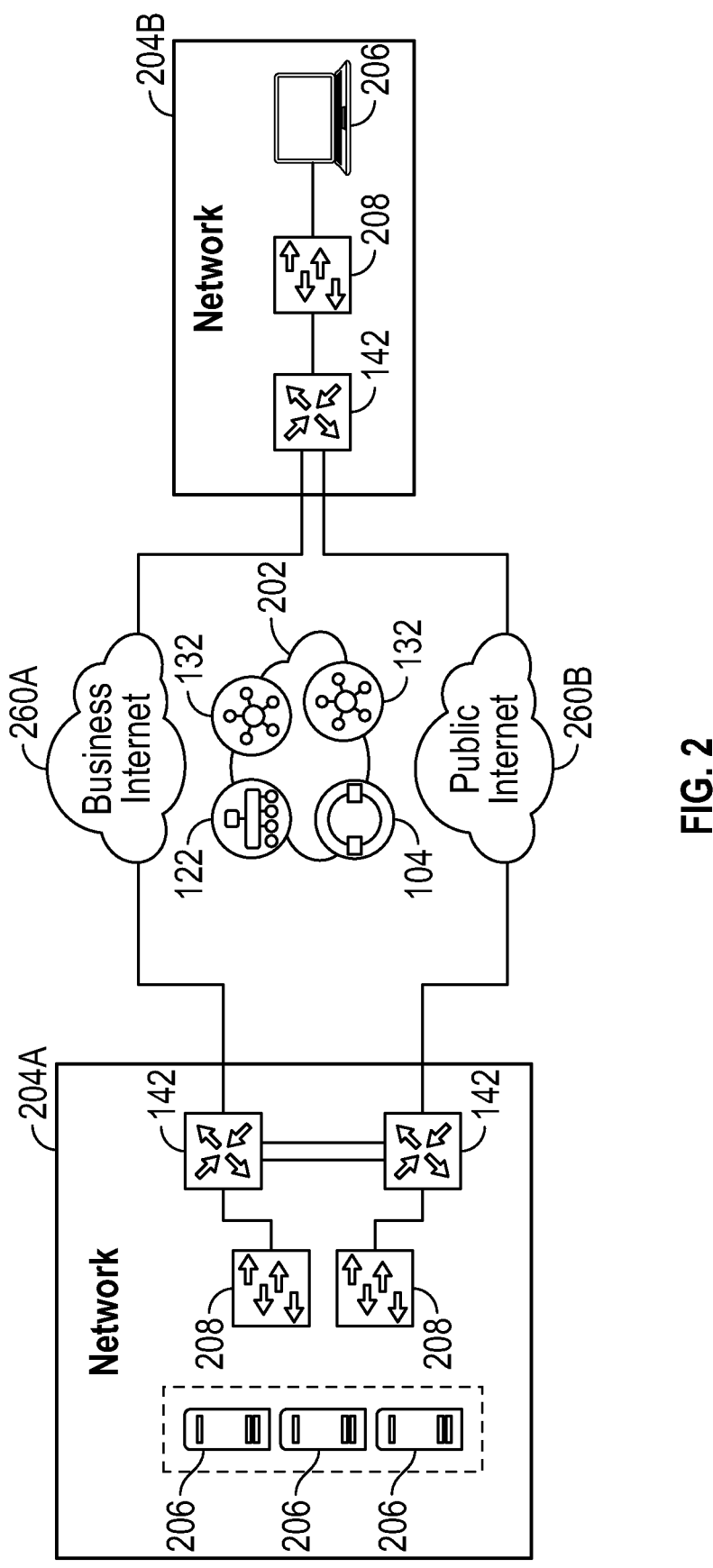
FIG. 2 illustrates an example of a network topology according to the present disclosure.
Figure 3:
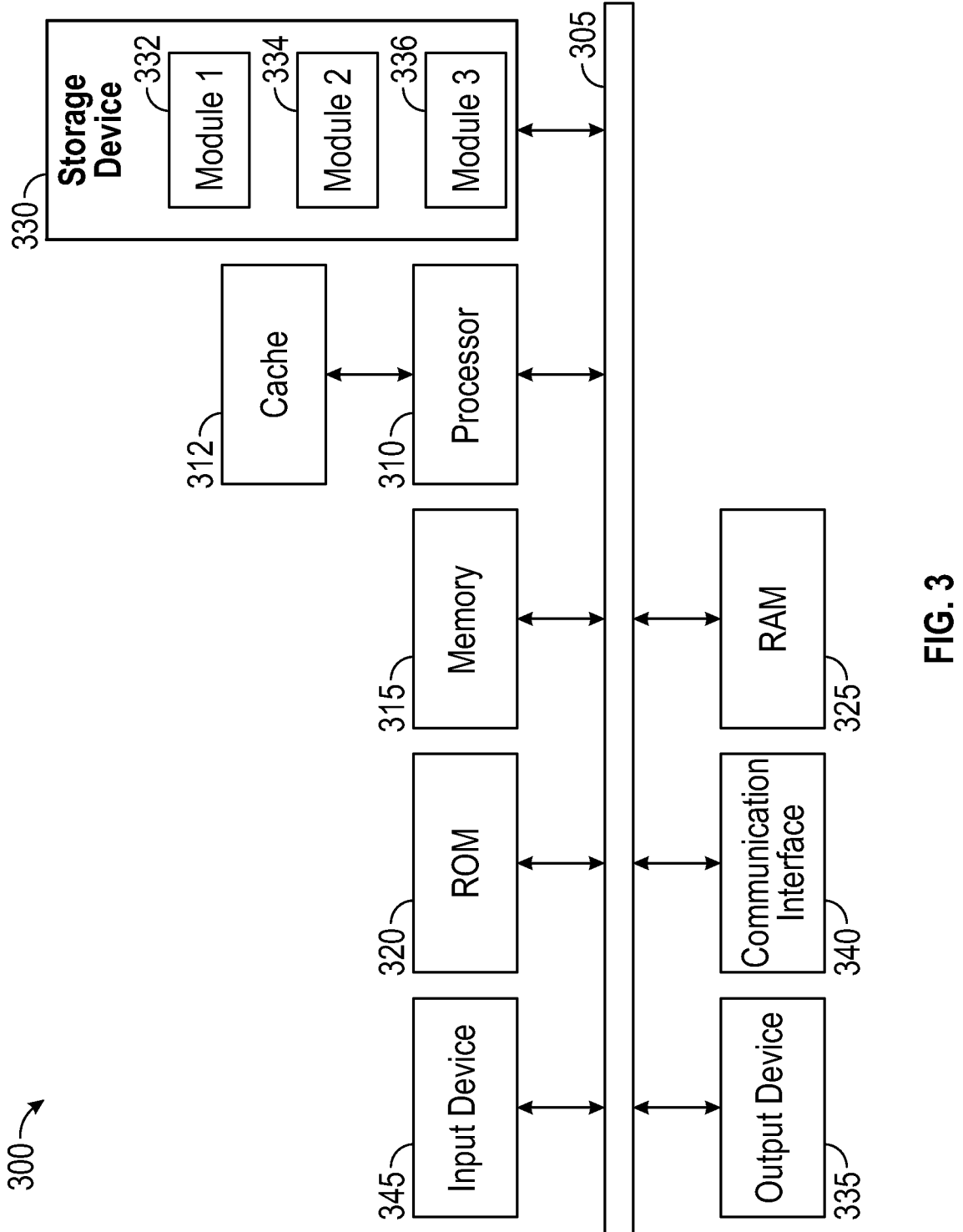
FIG. 3 shows an example of computing system, which can be for example any computing device.
Figure 4:
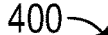
FIG. 4 illustrates an example of a network topology created in the simulator including the deployment of a micro-probe and a network impairment according to the present disclosure.
Figure 5:
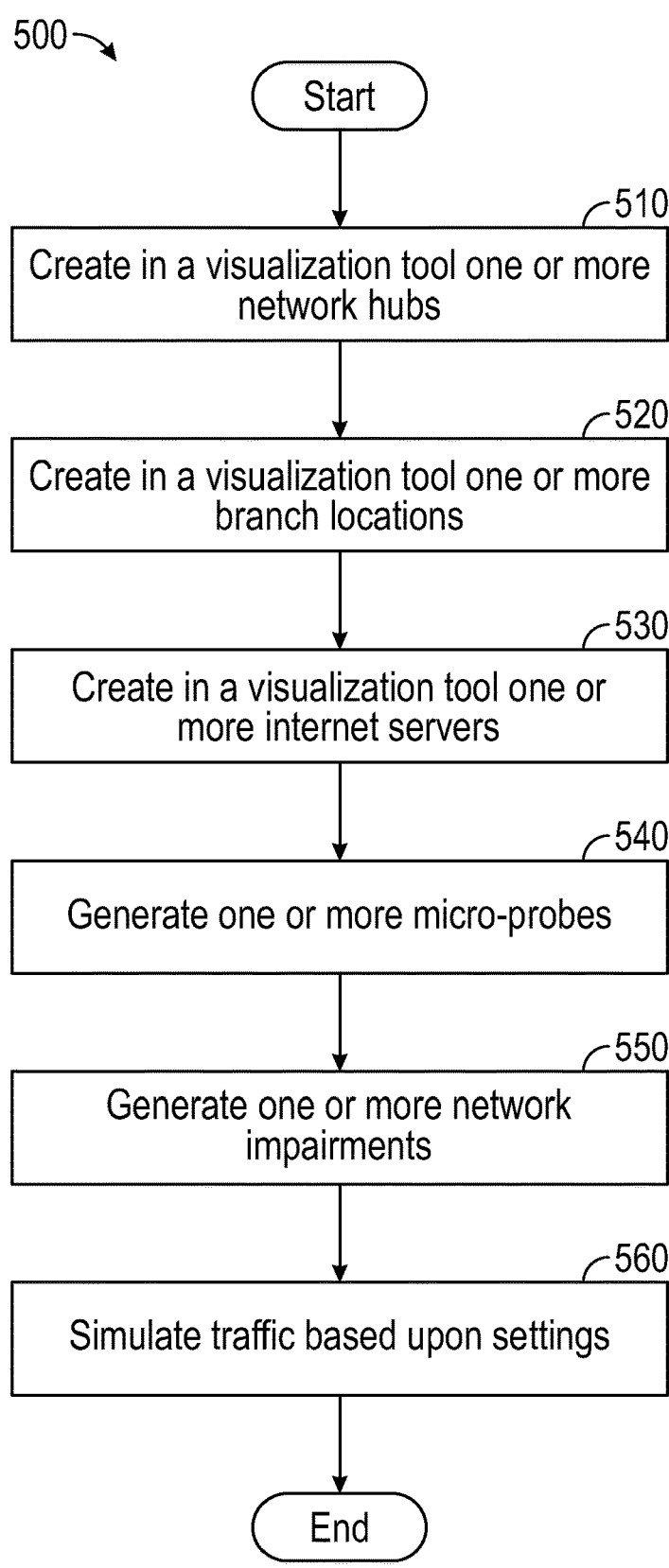
FIG. 5 illustrates an example method for simulating traffic and network impairment in a virtualized network fabric.

A description of a network and/or network architecture is illustrated in FIG. 1. FIG. 2 illustrates another arrangement of the network wherein the components are discussed on a simplified basis. FIG. 3 describes the components that can be associated with one or more of the devices of FIGS. 1, 2, and 4. FIG. 4 provides a more complicated arrangement for the components of FIG. 2, but simplified from perhaps actual implementations due to space constraints on a page. It is noted that the FIG. 4 is not an actual network, but a simulated virtualized network with simulated traffic and/or simulated network impairments. FIG. 5 provides a flow chart illustrating an example method according to the present disclosure.

FIG. 1 illustrates an example of a network architecture 100 for implementing aspects of the present technology. An example of an implementation of the network architecture 100 is the Cisco® SD-WAN architecture. However, one of ordinary skill in the art will understand that, for the network architecture 100 and any other system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, the network architecture 100 can comprise an orchestration plane 102, a management plane 120, a control plane 130, and a data plane 140. The orchestration plane can 102 assist in the automatic on-boarding of edge network devices 142 (e.g., switches, routers, etc.) in an overlay network. The orchestration plane 102 can include one or more physical or virtual network orchestrator appliances 104. The network orchestrator appliance(s) 104 can perform the initial authentication of the edge network devices 142 and orchestrate connectivity between devices of the control plane 130 and the data plane 140. In some embodiments, the network orchestrator appliance(s) 104 can also enable communication of devices located behind Network Address Translation (NAT). In some embodiments, physical or virtual Cisco® SD-WAN vBond appliances can operate as the network orchestrator appliance(s) 104.

The management plane 120 can be responsible for central configuration and monitoring of a network. The management plane 120 can include one or more physical or virtual network management appliances 122. In some embodiments, the network management appliance(s) 122 can provide centralized management of the network via a graphical user interface to enable a user to monitor, configure, and maintain the edge network devices 142 and links (e.g., Internet transport network 160, MPLS network 162, 4G/LTE network 164) in an underlay and overlay network. The network management appliance(s) 122 can support multitenancy and enable centralized management of logically isolated networks associated with different entities (e.g., enterprises, divisions within enterprises, groups within divisions, etc.). Alternatively or in addition, the network management appliance(s) 122 can be a dedicated network management system for a single entity. In some embodiments, physical or virtual Cisco® SD-WAN vManage appliances can operate as the network management appliance(s) 122. The management plane 120 can also include an analytics engine 124.

The control plane 130 can build and maintain a network topology and make decisions on where traffic flows. The control plane 130 can include one or more physical or virtual network controller appliance(s) 132. The network controller appliance(s) 132 can establish secure connections to each network device 142 and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the network controller appliance(s) 132 can operate as route reflectors. The network controller appliance(s) 132 can also orchestrate secure connectivity in the data plane 140 between and among the edge network devices 142. For example, in some embodiments, the network controller appliance(s) 132 can distribute crypto key information among the network device(s) 142. This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some embodiments, physical or virtual Cisco® SD-WAN vSmart controllers can operate as the network controller appliance(s) 132.

The data plane 140 can be responsible for forwarding packets based on decisions from the control plane 130. The data plane 140 can include the edge network devices 142, which can be physical or virtual network devices. The edge network devices 142 can operate at the edges various network environments of an organization, such as in one or more data centers or colocation centers 150, campus networks 152, branch office networks 154, home office networks 154, and so forth, or in the cloud (e.g., Infrastructure as a Service (IaaS), Platform as a Service (PaaS), SaaS, and other cloud service provider networks). The edge network devices 142 can provide secure data plane connectivity among sites over one or more WAN transports, such as via one or more Internet transport networks 160 (e.g., Digital Subscriber Line (DSL), cable, etc.), MPLS networks 162 (or other private packet-switched network (e.g., Metro Ethernet, Frame Relay, Asynchronous Transfer Mode (ATM), etc.), mobile networks 164 (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The edge network devices 142 can be responsible for traffic forwarding, security, encryption, quality of service (QOS), and routing (e.g., BGP, OSPF, etc.), among other tasks. In some embodiments, physical or virtual Cisco® SD-WAN vEdge routers can operate as the edge network devices 142.

FIG. 2 illustrates an example of a network topology 200 for showing various aspects of the network architecture 100. The network topology 200 can include a management network 202, a pair of network sites 204A and 204B (e.g., the data center(s) 150, the campus network(s) 152, the branch office network(s) 154, the home office network(s) 156, cloud service provider network(s), etc.), and a pair of Internet transport networks 260A and 260B. The management network 202 can include one or more network orchestrator appliances 104, one or more network management appliance 122, and one or more network controller appliances 132. Although the management network 202 is shown as a single network in this example, one of ordinary skill in the art will understand that each element of the management network 202 can be distributed across any number of networks and/or be co-located with the sites 204A, 204B. In this example, each element of the management network 202 can be reached through either transport network 260A or 260B.

Each site can include one or more endpoints 206 connected to one or more site network devices 208. The endpoints 206 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), car devices, etc.), and so forth. The endpoints 206 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

The site network devices 208 can include physical or virtual switches, routers, and other network devices. Although the site 204A is shown including a pair of site network devices and the site 204B is shown including a single site network device in this example, the site network devices 208 can comprise any number of network devices in any network topology, including multi-tier (e.g., core, distribution, and access tiers), spine-and-leaf, mesh, tree, bus, hub and spoke, and so forth. For example, in some embodiments, one or more data center networks may implement the Cisco® Application Centric Infrastructure (ACI) architecture and/or one or more campus networks may implement the Cisco® Software Defined Access (SD-Access or SDA) architecture. The site network devices 208 can connect the endpoints 206 to one or more edge network devices 142, and the edge network devices 142 can be used to directly connect to the transport networks 260A, 260B.

In some embodiments, "color" can be used to identify an individual WAN transport network, and different WAN transport networks may be assigned different colors (e.g., mpls, private1, biz-internet, metro-ethernet, lte, etc.). In this example, the network topology 200 can utilize a color called "biz-internet" for the Internet transport network 260A and a color called "public-internet" for the Internet transport network 260B.

In some embodiments, each edge network device 208 can form a Datagram Transport Layer Security (DTLS) or TLS control connection to the network controller appliance(s) 132 and connect to any network control appliance 132 over each transport network 260A, 260B. In some embodiments, the edge network devices 142 can also securely connect to edge network devices in other sites via IPSec tunnels. In some embodiments, the BFD protocol may be used within each of these tunnels to detect loss, latency, jitter, and path failures.

On the edge network devices 142, color can be used help to identify or distinguish an individual WAN transport tunnel (e.g., no same color may be used twice on a single edge network device). Colors by themselves can also have significance. For example, the colors metro-ethernet, mpls, and private1, private2, private3, private4, private5, and private6 may be considered private colors, which can be used for private networks or in places where there is no NAT addressing of the transport IP endpoints (e.g., because there may be no NAT between two endpoints of the same color). When the edge network devices 142 use a private color, they may attempt to build IPSec tunnels to other edge network devices using native, private, underlay IP addresses. The public colors can include 3g, biz, internet, blue, bronze, custom1, custom2, custom3, default, gold, green, lte, public-internet, red, and silver. The public colors may be used by the edge network devices 142 to build tunnels to post-NAT IP addresses (if there is NAT involved). If the edge network devices 142 use private colors and NAT to communicate to other private colors, the carrier setting in the configuration can dictate whether the edge network devices 142 use private or public IP addresses. Using this setting, two private colors can establish a session when one or both are using NAT.

FIG. 3 shows an example of computing system 300, which can be for example any computing device making up the network architecture or any component thereof in which the components of the system are in communication with each other using connection 305. Connection 305 can be a physical connection via a bus, or a direct connection into processor 310, such as in a chipset architecture. Connection 305 can also be a virtual connection, networked connection, or logical connection.

In some embodiments computing system 300 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 300 includes at least one processing unit (CPU or processor) 310 and connection 305 that couples various system components including system memory 315, such as read only memory (ROM) 320 and random-access memory (RAM) 325 to processor 310. Computing system 300 can include a cache of high-speed memory 312 connected directly with, in close proximity to, or integrated as part of processor 310.

Processor 310 can include any general-purpose processor and a hardware service or software service, such as services 332, 334, and 336 stored in storage device 330, configured to control processor 310 as well as a special-purpose processor where software instructions are incorporated into the actual processor design. Processor 310 can be a completely self-contained computing system, containing multiple cores or processors, a bus, memory controller, cache, etc. A multi-core processor may be symmetric or asymmetric.

To enable user interaction, computing system 300 includes an input device 345, which can represent any number of input mechanisms, such as a microphone for speech, a touch-sensitive screen for gesture or graphical input, keyboard, mouse, motion input, speech, etc. Computing system 300 can also include output device 335, which can be one or more of a number of output mechanisms known to those of skill in the art. In some instances, multimodal systems can enable a user to provide multiple types of input/output to communicate with computing system 300. Computing system 300 can include communications interface 340, which can generally govern and manage the user input and system output. There is no restriction on operating on any particular hardware arrangement and therefore the basic features here may easily be substituted for improved hardware or firmware arrangements as they are developed.

Storage device 330 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 330 can include software services, servers, services, etc., that when the code that defines such software is executed by the processor 310, it causes the system to perform a function. In some embodiments, a hardware service that performs a particular function can include the software component stored in a computer-readable medium in connection with the hardware components, such as processor 310, connection 305, output device 335, etc., to carry out the function.

FIG. 4 illustrates an example of a network topology created in the virtual environment including a traffic generator and network impairment tool. As illustrated, the simulated network fabric can be made to resemble a real-world topology. For example, the real-world topology can be such as described above in FIGS. 1 and 2. Other real-world topologies can be virtualized in the simulator. In at least one example, the virtual environment can be a hypervisor layer. The virtualized environment simulator can generate a graphical user interface (GUI) 400 that allows for visualization of the simulated virtualized network. The GUI 400 displays a variety of different simulated components in a virtualized network architecture. A virtual hub 402 is illustrated along with a first virtual branch 430, a second virtual branch 440, and a third virtual branch 450. In other examples, the number of virtual branches could be greater or less than that as illustrated. Additionally, the GUI 400 includes a first virtual network 420 and a second virtual network 460. The first virtual network 420 can be a multi-protocol label switching (MPLS) virtual network. The second virtual network 460 can be the internet. The second virtual network 460 can also include a second virtual server 462.

A first virtual branch 430 can include a first micro-probe (mp1) 432 and a first virtual bridge (vb1) 434. The mp1 like other micro-probes presented herein consists of a network namespace, a veth pair device, and one or more traffic invokers. Traffic invokers can be implemented through a mini-user space process to generate stateful application traffic by leveraging socket communication. Each traffic invoker can simulate behavior of a client or server (mp1 being that of a client). By including multiple traffic invokers in the micro-probe, a micro-probe can have multiple different traffic flows and patterns. The traffic flow can be such as that of any of the existing or anticipated traffic flows for example ipv4/ipv6, in L3 layer, udp/tcp in L4 layer, http/https/ssl, and/or quic. Additionally, the traffic pattern can include behavior of a socket process such as elephant flow, long-live flow, symmetric flow, asymmetric flow, and/or other known flows. The network namespace can be an identifier used to identify the particular micro-probe and the client/server that the micro-probe is intended to simulate. Additionally, the first virtual branch 430 can include one or more virtual edge devices 436 that allow connecting the first virtual branch 430 to other components.

The virtual hub 402 can include multiple virtual devices and different simulation configurations. As illustrated the simulation virtual hub 402 configuration includes a virtual hub client device 406 and a virtual hub server 408. The virtual hub 402 also includes a virtual traffic generator in the form of a second micro-probe (mp2) 404 representing a virtual hub server and a second virtual bridge (vb2) 410. The virtual hub 402 can also include a virtual hub server 408 being a seventh micro-probe (mp7) and a virtual hub client device 406 being an eighth micro-probe (mp8). While the virtual hub server 408 is not illustrated as being electronically coupled to another device, the virtual hub server 408 can be electronically coupled in other examples. Additionally, the simulation in other instances includes one or more additional micro-probes to represent additional virtual hub servers and virtual hub client devices. The virtual hub 402 can include two or more virtual hub edge devices 412, 414.

The second virtual branch 440 can include a second virtual branch client (client 2) 442 represented by a fourth micro-probe (mp4) and second virtual branch server (server 3) 444 simulated by a third micro-probe (mp3). The second virtual branch 440 can also include one or more second virtual branch edge devices 446. The third virtual branch 450 can include a third virtual branch client (client3) 452 simulated by a fifth micro-probe (mp5) and one or more virtual edge devices 454.

Additionally, as illustrated one or more network impairment tools in the form of one or more micro-tcs. As illustrated, there are three micro-tcs illustrated. A first micro-tc 472 (mc1) is associated near the second virtual branch 440. A second micro-tc 474 (mc2) is associated near virtual hub 402 and virtual hub edge device 412. A third micro-tc 476 (mc3) is located within or near the second virtual network 460. The examples of micro-tc can use linux TC to inject network impartment to the virtual interface directly. For example, the micro-tc can inject lose, delay, jitter and/or other types of network impairment into the system. The network impairment can be injected at an endpoint or other location.

Traffic is illustrated as flowing through lines S1-S8. While the traffic is illustrated by lines, the communication can be through any means of communication including wired and/or wireless type communication. S1 illustrates communication between the first virtual client 432 simulated by a first micro-probe (mp1) of the first virtual branch 430 to the first virtual server 404 simulated by a second-micro-probe (mp2) of the virtual hub 402. Likewise, S2 illustrates the communication between the second virtual branch client 442 simulated by a fourth micro-probe (mp4) and the first virtual server 404 simulated by the second micro-probe (mp2). Similarly, S3 indicates the communication between the third virtual client 452 simulated by a fifth micro-probe (mp5) and the first virtual server 404 simulated by the second micro-probe (mp2). S4-S6 indicate the communication between the virtual clients in a branch with one or more public internet servers, an example of which is second virtual server 462 simulated by a sixth micro-probe (mp6). The one or more public internet servers can include internet servers for particular services such as streaming services, video services, search engines, and/or other external servers that are accessed through the second virtual network (internet) 460. S4 indicates the communication between a first micro-probe (mp1) 432 and second virtual server 462 simulated by the sixth micro-probe (mp6). S5 indicates the communication between second virtual branch client 442 simulated by a fourth micro-probe (mp4) and second virtual server 462 simulated by the sixth micro-probe (mp6). S6 indicates the communication between third virtual client 452 simulated by a fifth micro-probe (mp5) and second virtual server 462 simulated by a sixth micro-probe (mp6). S7 provides communication between a server in a branch site to a client in a hub site. As illustrated third virtual branch server 444 simulated by a third micro-probe (mp3) communicates through S7 to virtual hub client device 406 simulated by an eighth micro-probe (mp8). S8 indicates communication between client in one branch site with a server in another branch site. As illustrated, third virtual client 452 simulated by the fifth micro-probe (mp5) communicates to third virtual branch server 444 simulated by the third micro-probe (mp3) over S8. While paths of communication are illustrated, these are not the only paths that can be implemented. Other paths can be included, and the examples are for illustrative purposes only.

The deployment of the micro-probes and micro-tcs can be adjusted on demand in terms of location. Additionally, the micro-probes can have the traffic pattern adjusted. The traffic pattern can be based upon real-time data or pre-recorded data. In other instances, the traffic can be simulated based upon predicted scenarios. The micro-tcs can be adjusted in terms of the particular type of network impairment that is desired to be simulated. In other instances, multiple different types of network impairments can be simulated through each of the micro-tcs.

FIG. 5 illustrates an example method 500 for simulating traffic flow in a simulated virtualized network fabric. Although the example method 500 depicts a particular sequence of operations, the sequence may be altered without departing from the scope of the present disclosure. For example, some of the operations depicted may be performed in parallel or in a different sequence that does not materially affect the function of the method 500. In other examples, different components of an example device or system that implements the method 500 may perform functions at substantially the same time or in a specific sequence. In at least one example, the method can be implemented by a device such as the one illustrated in FIG. 3. In other examples, the device can be one or more devices that are implemented as part of the network including, but not limited to the network controller. The visualization tool can resemble the illustration of FIG. 4, which is an example of a screen image from the visualization tool. The visualization tool can enable an operator to configure the desired components of the network as described herein. In at least one example, the components of the network include one or more network hubs, one or more branch locations, and one or more internet servers.

According to some examples, the method includes generating in a visualization tool one or more virtual network hubs at block 510. For example, the device illustrated in FIG. 3 may create in a visualization tool one or more virtual network hubs. The one or more virtual network hubs can include multiple virtual devices that are simulated by respective micro-probes, which are configured to simulate the desired traffic. The virtual network hub can include one or more servers and/or one or more client devices, each of the servers and devices being represented by respective micro-probes, which are configured to simulate the desired traffic. The virtual client devices can include a plurality of different types of devices that are enabled to connect to the network.

According to some examples, the method includes generating in a visualization tool one or more virtual branch locations at block 520. For example, the device illustrated in FIG. 3 may create in a visualization tool one or more virtual branch locations. The one or more virtual branch locations can include multiple virtual devices that are simulated by respective micro-probes, which are configured to simulate the desired traffic. The network hub can include one or more virtual servers and/or one or more virtual client devices, each of the servers and devices being represented by respective micro-probes, which are configured to simulate the desired traffic. The virtual client devices can include a plurality of different types of devices that are enabled to connect to the network.

According to some examples, the method includes generating in a visualization tool one or more virtual internet servers at block 530, each of the internet servers being represented by respective micro-probes, which are configured to simulate the desired traffic. For example, the device illustrated in FIG. 3 may create in a visualization tool one or more virtual internet servers, each of the internet servers being represented by respective micro-probes, which are configured to simulate the desired traffic.

According to some examples, the method includes generating one or more micro-probes for a plurality of clients/servers to be simulated at block 540. For example, the device illustrated in FIG. 3 may generate one or more micro-probes for a plurality of clients/servers to be simulated. One or more of the plurality of clients/servers can be located in each of the one or more virtual network hubs, the one or more virtual branch locations, and the one or more virtual internet servers. Each of the one or more micro-probes includes of a pair of ethernet tunnels, a network namespace, and one or more traffic invokers. The one or more traffic invokers can simulate behavior of a virtual client or a virtual server depending on a virtual ethernet device that a respective traffic invoker is designed to simulate. Each of the one or more micro-probes simulates customized types of flow patterns. The types of flow patterns include at least one of elephant flow, long-live flow, symmetric flow, and/or asymmetric flow. The network namespace can include a logical copy of a network stack from a host system and includes a new IP address, network interface, and/or routing tables. In at least one example, generating one or more micro-probes includes generating at least one micro-probe for each of the virtual ethernet devices. In at least one example, the virtual ethernet devices includes at least a client and a server. In at least one example, the virtual ethernet devices includes a virtual network device. Additional devices are represented in the visualization tool through one or more additional micro-probes. Additionally, other features of the micro-probes can be found in relation to FIG. 4 above.

According to some examples, the method includes generating one or more network impairments at block 550. For example, the device illustrated in FIG. 3 may generate one or more network impairments. The one or more network impairments are a micro-tc. The micro-tc is used to simulate the network impairment. The network impairments can be associated with one or more of the one or more of network hubs, branch locations, and/or internet server. The one or more network impairments are one or more micro-tc that can simulate one or more of jitter, loss, and/or delay. In one example, separate micro-tcs can be implemented and in other examples the micro-tc can combine one or more of the desired impairments. In at least one example, the micro-tc is operable to simulate jitter. In at least one example, the micro-tc is operable to simulate loss. In at least one example, the micro-tc is operable to simulate latency.

The method includes simulating the traffic flow based upon the micro-probes and/or micro-tcs that have been arranged in the visualization tool. The simulation of the traffic flow can include generating reports related thereto and/or alarms to indicate problems within the simulated traffic flow to indicate when and/or where the simulated traffic is encountering one or more problems. This allows for the desired network architecture to be explored either before or after actual deployment. The simulation can be modified by including additional micro-probes to solves the problem or change the problem as the network traffic changes. Likewise, the micro-tcs can be adapted as well.

According to some examples, the method includes launching one or more, client-role or server-role traffic invokers in each micro-probe to simulate to simulate traffic between the one or more of the network hubs, branch locations, and/or internet servers at block 560. For example, the device illustrated in FIG. 3 may launch one or more, client-role or server-role traffic invokers in each micro-probe to simulate to simulate traffic between the one or more of the network hubs, branch locations, and/or internet servers.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per sc.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Aspect 1. A method for simulating traffic and network impairment in a virtualized network fabric, the method comprising: creating in a visualization tool one or more virtual network hubs, one or more virtual branch locations, and one or more virtual internet servers; generating one or more micro-probes for a plurality of clients/servers to be simulated, one or more of the plurality of clients/servers is located in each of the one or more virtual network hubs, the one or more virtual branch locations, and the one or more virtual internet servers; generating one or more network impairments, which are associated with one or more of the one or more of network hubs, branch locations, and/or internet server; and launching one or more, client-role or server-role traffic invokers in each micro-probe to simulate traffic between the one or more of the virtual network hubs, the virtual branch locations, and/or the virtual internet server.

Aspect 2. The method of Aspect 1, wherein each of the one or more micro-probes includes a pair of ethernet tunnels, a network namespace, and one or more traffic invokers.

Aspect 3. The method of any of Aspects 1 to 2, wherein each of the one or more micro-probes simulates customized types of flow patterns.

Aspect 4. The method of Aspects 3, wherein the types of flow patterns include at least one of elephant flow, long-live flow, symmetric flow, and/or asymmetric flow.

Aspect 5. The method of any of Aspects 1 to 4, wherein the network namespace includes a logical copy of a network stack from a host system and includes a new IP address, network interface, and/or routing tables.

Aspect 6. The method of any of Aspects 1 to 5, wherein additional devices are represented in the visualization tool through one or more additional micro-probes.

Aspect 7. The method of any of Aspects 1 to 6, wherein the one or more network impairments is a micro-tc operable to simulate jitter.

Aspect 8. The method of any of Aspects 1 to 7, wherein the one or more network impairments is a micro-tc operable to simulate loss.

Aspect 9. The method of any of Aspects 1 to 8, wherein the one or more network impairments is a micro-tc operable to simulate latency.

Aspect 10. A system includes a storage (implemented in circuitry) configured to store data and a processor. The processor configured to configured to execute the instructions and cause the processor to: create in a visualization tool one or more virtual network hubs, one or more virtual branch locations, and one or more virtual internet servers; generate one or more micro-probes for a plurality of clients/servers to be simulated, one or more of the plurality of clients/servers is located in each of the one or more virtual network hubs, the one or more virtual branch locations, and the one or more virtual internet servers; generate one or more network impairments, which are associated with one or more of the one or more of network hubs, branch locations, and/or internet server; and launch one or more, client-role or server-role traffic invokers in each micro-probe to simulate traffic between the one or more of the virtual network hubs, the virtual branch locations, and/or the virtual internet server.

Aspect 11. The system of Aspect 10, wherein each of the one or more micro-probes includes of a pair of ethernet tunnels, a network namespace, and one or more traffic invokers.

Aspect 12. The system of any of Aspects 10 to 11, wherein each of the one or more micro-probes simulates customized types of flow patterns.

Aspect 13. The system of any of Aspects 10 to 12, wherein the types of flow patterns include at least one of elephant flow, long-live flow, symmetric flow, and/or asymmetric flow.

Aspect 14. The system of any of Aspects 10 to 13, wherein the network namespace includes a logical copy of a network stack from a host system and includes a new IP address, network interface, and/or routing tables.

Aspect 15. The system of any of Aspects 10 to 14, wherein additional devices are represented in the visualization tool through one or more additional micro-probes.

Aspect 16. The system of any of Aspects 10 to 15, wherein the one or more network impairments is a micro-tc operable to simulate jitter.

Aspect 17. The system of any of Aspects 10 to 16, wherein the one or more network impairments is a micro-tc operable to simulate loss.

Aspect 18. The system of any of Aspects 10 to 17, wherein the one or more network impairments is a micro-tc operable to simulate latency.

Aspect 19. A computer readable medium comprising simulation or design intent data using a computer system. The computer includes a memory (e.g., implemented in circuitry) and a processor (or multiple processors) coupled to the memory. The processor (or processors) is configured to execute the computer readable medium and cause the processor to: create in a visualization tool one or more virtual network hubs, one or more virtual branch locations, and one or more virtual internet servers; generate one or more micro-probes for a plurality of clients/servers to be simulated, one or more of the plurality of clients/servers is located in each of the one or more virtual network hubs, the one or more virtual branch locations, and the one or more virtual internet servers; generate one or more network impairments, which are associated with one or more of the one or more of network hubs, branch locations, and/or internet server; and launch one or more, client-role or server-role traffic invokers in each micro-probe to simulate traffic between the one or more of the virtual network hubs, the virtual branch locations, and/or the virtual internet server.

Aspect 20. The computer readable medium of Aspect 19, wherein each of the one or more micro-probes includes of a pair of ethernet tunnels, a network namespace, and one or more traffic invokers.

Aspect 21. The computer readable medium of any of Aspects 19 to 20, wherein each of the one or more micro-probes simulates customized types of flow patterns.

Aspect 22. The computer readable medium of any of Aspects 19 to 21, wherein the types of flow patterns include at least one of elephant flow, long-live flow, symmetric flow, and/or asymmetric flow.

Aspect 23. The computer readable medium of any of Aspects 19 to 22, wherein the network namespace includes a logical copy of a network stack from a host system and includes a new IP address, network interface, and/or routing tables.

Aspect 24. The computer readable medium of any of Aspects 19 to 23, wherein additional devices are represented in the visualization tool through one or more additional micro-probes.

Aspect 25. The computer readable medium of any of Aspects 19 to 24, wherein the one or more network impairments is a micro-tc operable to simulate jitter.

Aspect 26. The computer readable medium of any of Aspects 19 to 25, wherein the one or more network impairments is a micro-tc operable to simulate loss.

Aspect 27. The computer readable medium of any of Aspects 19 to 26, wherein the one or more network impairments is a micro-tc operable to simulate latency.

What is claimed is:

1. A method for simulating traffic and network impairment in a virtualized network fabric, the method comprising:

creating in a visualization tool one or more virtual network hubs, one or more virtual branch locations, and one or more virtual internet servers;

generating one or more micro-probes for a plurality of clients/servers to be simulated, one or more of the plurality of clients/servers is located in each of the one or more virtual network hubs, the one or more virtual branch locations, and the one or more virtual internet servers;

generating one or more network impairments, which are associated with one or more of the virtual network hubs, the virtual branch locations, and/or the virtual internet servers; and launching one or more, client-role or server-role traffic invokers in each micro-probe to simulate traffic between the virtual network hubs, the virtual branch locations, and/or the virtual internet server; and during the flow of the simulated traffic, injecting the one or more network impairments to simulate the one or more network impairments between the virtual network hubs, the virtual branch locations, and/or the virtual internet server, wherein each of the one or more micro-probes includes of a pair of ethernet tunnels, a network namespace, and one or more traffic invokers.

2. The method of claim 1, wherein each of the one or more micro-probes simulates customized types of flow patterns.

3. The method of claim 2, wherein the types of flow patterns include at least one of elephant flow, long-live flow, symmetric flow, and/or asymmetric flow.

4. The method of claim 1, wherein the network namespace includes a logical copy of a network stack from a host system and includes a new IP address, network interface, and/or routing tables.

5. The method of claim 1, wherein additional devices are represented in the visualization tool through one or more additional micro-probes.

6. The method of claim 1, wherein the one or more network impairments are a micro-tc that is operable to simulate jitter.

7. The method of claim 1, wherein the one or more network impairments are a micro-tc that is operable to simulate loss.

8. The method of claim 1, wherein the one or more network impairments are a micro-tc that is operable to simulate latency.

9. The method of claim 1, further comprising:

generating reports in response to the simulated traffic to indicate problems when or where the simulated traffic is encountering one or more problems.

10. A system comprising:

a storage configured to store instructions; and a processor configured to execute the instructions and cause the processor to:

create in a visualization tool one or more virtual network hubs, one or more virtual branch locations, and one or more virtual internet servers;

generate one or more micro-probes for a plurality of clients/servers to be simulated, one or more of the plurality of clients/servers is located in each of the one or more virtual network hubs, the one or more virtual branch locations, and the one or more virtual internet servers;

generate one or more network impairments, which are associated with one or more of the virtual network hubs, virtual branch locations, and/or virtual internet server; and launch one or more, client-role or server-role traffic invokers in each micro-probe to simulate traffic between the virtual network hubs, the virtual branch locations, and/or the virtual internet server; and during the flow of the simulated traffic, inject the one or more network impairments to simulate the one or more network impairments between the virtual network hubs, the virtual branch locations, and/or the virtual internet server, wherein each of the one or more micro-probes includes of a pair of ethernet tunnels, a network namespace, and one or more traffic invokers.

11. The system of claim 10, wherein each of the one or more micro-probes simulates customized types of flow patterns.

12. The system of claim 11, wherein the types of flow patterns include at least one of elephant flow, long-live flow, symmetric flow, and/or asymmetric flow.

13. The system of claim 10, wherein the network namespace includes a logical copy of a network stack from a host system and includes a new IP address, network interface, and/or routing tables.

14. The system of claim 10, wherein additional devices are represented in the visualization tool through one or more additional micro-probes.

15. The system of claim 10, wherein the one or more network impairments are a micro-tc that is operable to simulate jitter.

16. The system of claim 10, wherein the one or more network impairments are a micro-tc that is operable to simulate loss.

17. The system of claim 10, wherein the one or more network impairments are a micro-tc that is operable to simulate latency.

18. The system of claim 10, wherein the processor is further configured to execute the instructions and cause the processor to:

generate reports in response to the simulated traffic to indicate problems when or where the simulated traffic is encountering one or more problems.

19. A non-transitory computer readable medium comprising instructions, the instructions, when executed by a computing system, cause the computing system to:

create in a visualization tool one or more virtual network hubs;

create in a visualization tool one or more virtual branch locations;

create in a visualization tool one or more virtual internet servers;

generate one or more micro-probes for a plurality of clients/servers to be simulated, one or more of the plurality of clients/servers is located in each of the one or more virtual network hubs, the one or more virtual branch locations, and the one or more virtual internet servers;

generate one or more network impairments, which are associated with the virtual network hubs, the virtual branch locations, and/or the virtual internet server; and launch one or more, client-role or server-role traffic invokers in each micro-probe to simulate traffic between the virtual network hubs, the virtual branch locations, and/or the virtual internet server; and during the flow of the simulated traffic, inject the one or more network impairments to simulate the one or more network impairments between the virtual network hubs, the virtual branch locations, and/or the virtual internet server, wherein each of the one or more micro-probes includes of a pair of ethernet tunnels, a network namespace, and one or more traffic invokers.

20. The transitory computer readable medium of claim 19, wherein each of the one or more micro-probes simulates customized types of flow patterns.

* * * * *